United States Patent [19]

Roof et al.

[11] Patent Number: 4,843,533

[45] Date of Patent: Jun. 27, 1989

[54] TRANSIENT RIDE-THROUGH AC INVERTER

[75] Inventors: Richard W. Roof, Lexington; G. Marshall Horne, Elgin, both of S.C.

[73] Assignee: Square D Company, Palatine, Ill.

[21] Appl. No.: 819,169

[22] Filed: Jan. 15, 1986

[51] Int. Cl.[4] .............................................. H02H 7/122
[52] U.S. Cl. ........................................ 363/55; 363/58; 361/90; 361/91; 361/111
[58] Field of Search ........................ 363/50, 51, 55, 56, 363/57, 58, 95, 96, 98, 135, 136, 34–37; 318/798, 806; 361/56, 90, 91, 100, 111

[56] References Cited

U.S. PATENT DOCUMENTS

| | | | |
|---|---|---|---|
| 3,471,749 | 10/1969 | Harris | 361/100 X |
| 3,800,198 | 3/1974 | Graf et al. | 363/57 X |
| 3,831,077 | 8/1974 | Richeson, Jr. | 363/50 X |
| 3,876,922 | 4/1975 | Forstbauer | 361/100 X |
| 3,992,659 | 11/1976 | Ekstrom | 363/51 |
| 4,063,302 | 12/1977 | Donig et al. | 361/90 |
| 4,158,163 | 6/1979 | Eriksen et al. | 318/798 |
| 4,188,663 | 2/1980 | Okawa et al. | 363/51 |
| 4,247,888 | 1/1981 | Angquist | 363/37 X |
| 4,270,078 | 5/1981 | Walker et al. | 363/37 X |
| 4,328,454 | 5/1982 | Okuyama et al. | 363/37 X |
| 4,331,994 | 5/1982 | Wirth | 363/34 X |
| 4,346,421 | 8/1982 | Gurr | 361/57 |
| 4,437,133 | 3/1984 | Rueckert | 363/50 X |
| 4,475,150 | 10/1984 | D'Atre et al. | 363/51 |
| 4,521,840 | 6/1985 | Hoadley | 363/35 |
| 4,555,750 | 11/1985 | Matsumura et al. | 363/37 |

Primary Examiner—Patrick R. Salce
Assistant Examiner—Emanuel Todd Voeltz
Attorney, Agent, or Firm—Richard T. Guttman; A. Sidney Johnston

[57] ABSTRACT

A transient protection circuit for an inverter has a rectifier capable of supplying direct current from an alternating current power source, where protection is provided against a voltage transient in the AC power source. A DC bus is fed by the rectifier. A bus capacitor is connected across the DC bus. Solid state switches are connected to the DC bus for supplying alternating current to a load. The DC bus voltage is sensed. In response to a transient rise in the DC bus voltage, a resistor is connected across the bus capacitor to provide a discharge path, the solid state switches are disconnected from the DC bus, and after the transient dies away from the DC bus, the solid state switches are reconnected to the bus and the discharge resistor is disconnected from across the bus capacitor.

16 Claims, 3 Drawing Sheets

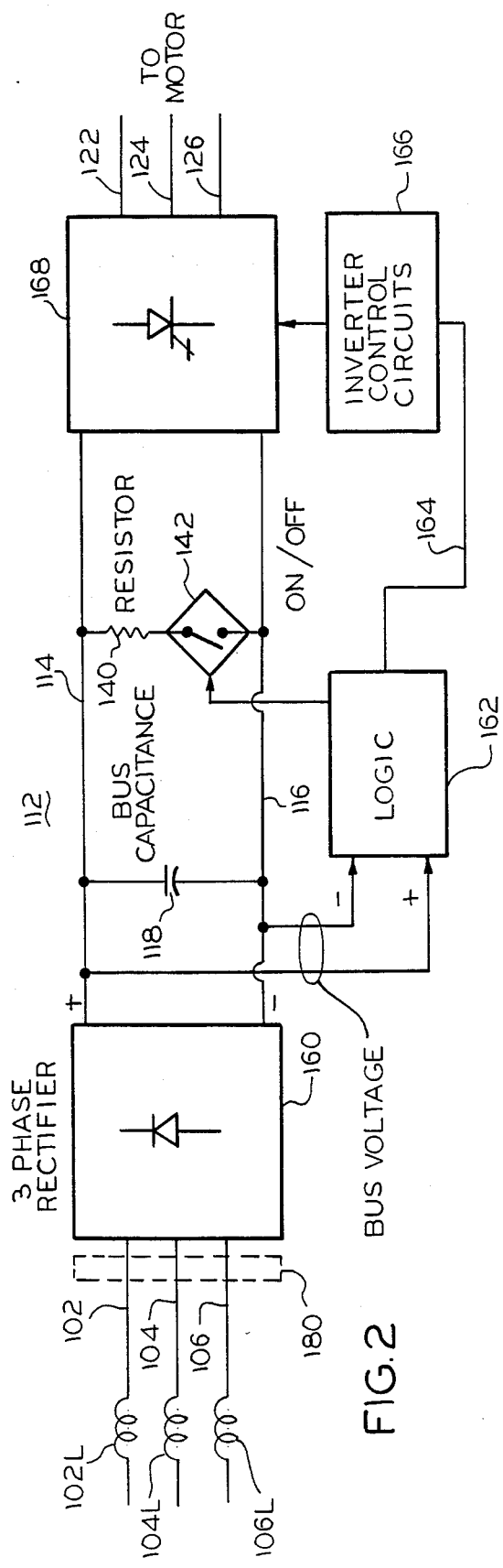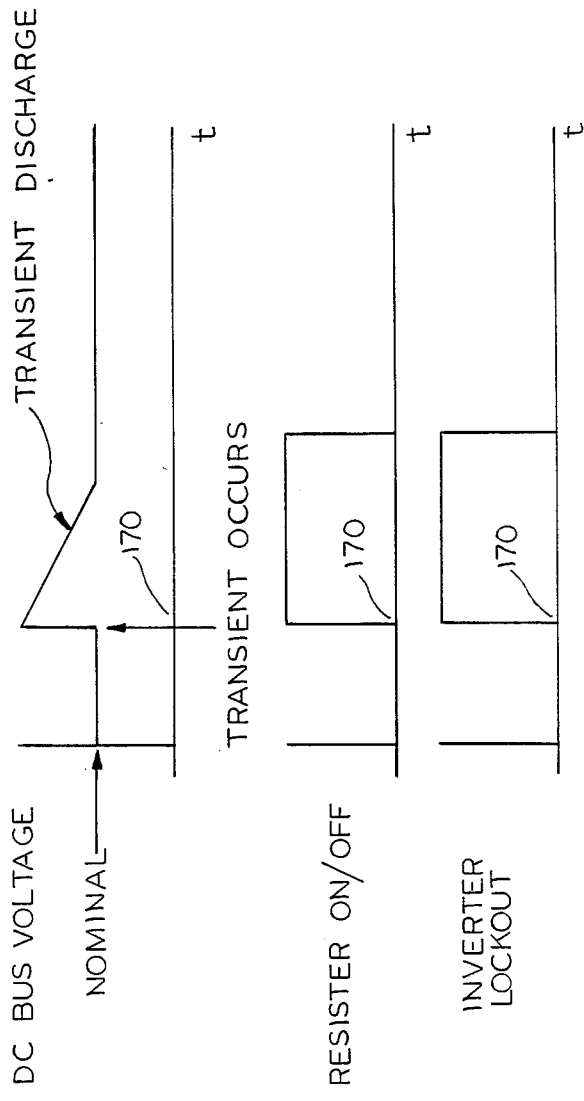

TRANSIENT RIDE-THROUGH AC INVERTER

FIELD OF THE INVENTION

This invention relates to inverters for producing an alternating current voltage for an AC motor and energized by a DC bus which is in turn energized by a rectifier, and more particularly, relates to protection of the solid state switches from a voltage transient.

INTRODUCTION TO THE INVENTION

A typical alternating current (AC) inverter operates from a three phase alternating current power line. The three phase alternating current supply is rectified and the rectified energy energizes a direct current (DC) bus. Solid state switches are energized from the DC bus and provide an alternating current supply to a motor. The fundamental frequency of the alternating current supplied to the motor may be varied by control of the solid state switches.

In typical practical application of an AC inverter, the three phase alternating current power line will have numerous voltage variations and transients superimposed upon the nominal voltage. These transients on the alternating current supply line may be sufficient to drive the voltage on the DC bus to a value exceeding the rating values of the solid state components of the inverter. When the DC bus voltage exceeds the rating voltages of the solid state components, then the solid state components may be destroyed. It is important in the practical operation of the AC inverter to provide protection of the solid state switches from excessive voltages produced by transients on the alternating current power line. Numerous protection schemes for the solid state switches in an inverter have been disclosed in the literature, for example, U.S. Pat. No. 4,331,994, issued to Wirth on May 25, 1982, shows one such scheme. Also, U.S. Pat. No. 4,437,133, issued to Rueckert on Mar. 13, 1984 shows another such scheme. Further, U.S. Pat. No. 4,270,078, issued to Walker, et al. on May 26, 1981 shows another such scheme.

SUMMARY OF THE INVENTION

The invention protects the solid state components of an inverter from transients on the alternating current power line. A transient protection circuit for an inverter having a DC bus, a bus capacitor connected across the DC bus, and solid state switches for driving a load comprises, means for sensing the voltage on the DC bus, a resistor, and means responsive to the voltage on the DC bus for connecting the resistor in parallel with the bus capacitor when the DC bus voltage exceeds a predetermined voltage, and means responsive to the voltage on the DC bus for turning off the solid state switches when the DC bus voltage exceeds the predetermined voltage. Also, a means is provided for disconnecting the resistor from a parallel connection with the bus capacitor and also for turning on the solid state switches after a predetermined idle time interval following an excursion of DC voltage above the predetermined voltage. Also, a means is provided for turning off the solid state switches until they are manually reset when the means responsive to the voltage on the DC bus senses a second excursion of the DC bus voltage above the predetermined voltage within a predetermined waiting time interval.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views:

FIG. 2 is a block diagram of an AC inverter.

FIG. 3 is a graph of DC has voltage.

FIG. 4 is a graph showing connection and disconnection of a resistor across a DC bus.

FIG. 5 is a graph showing the turn of the AC inverter versus time.

DETAILED DESCRIPTION

Figure 1:
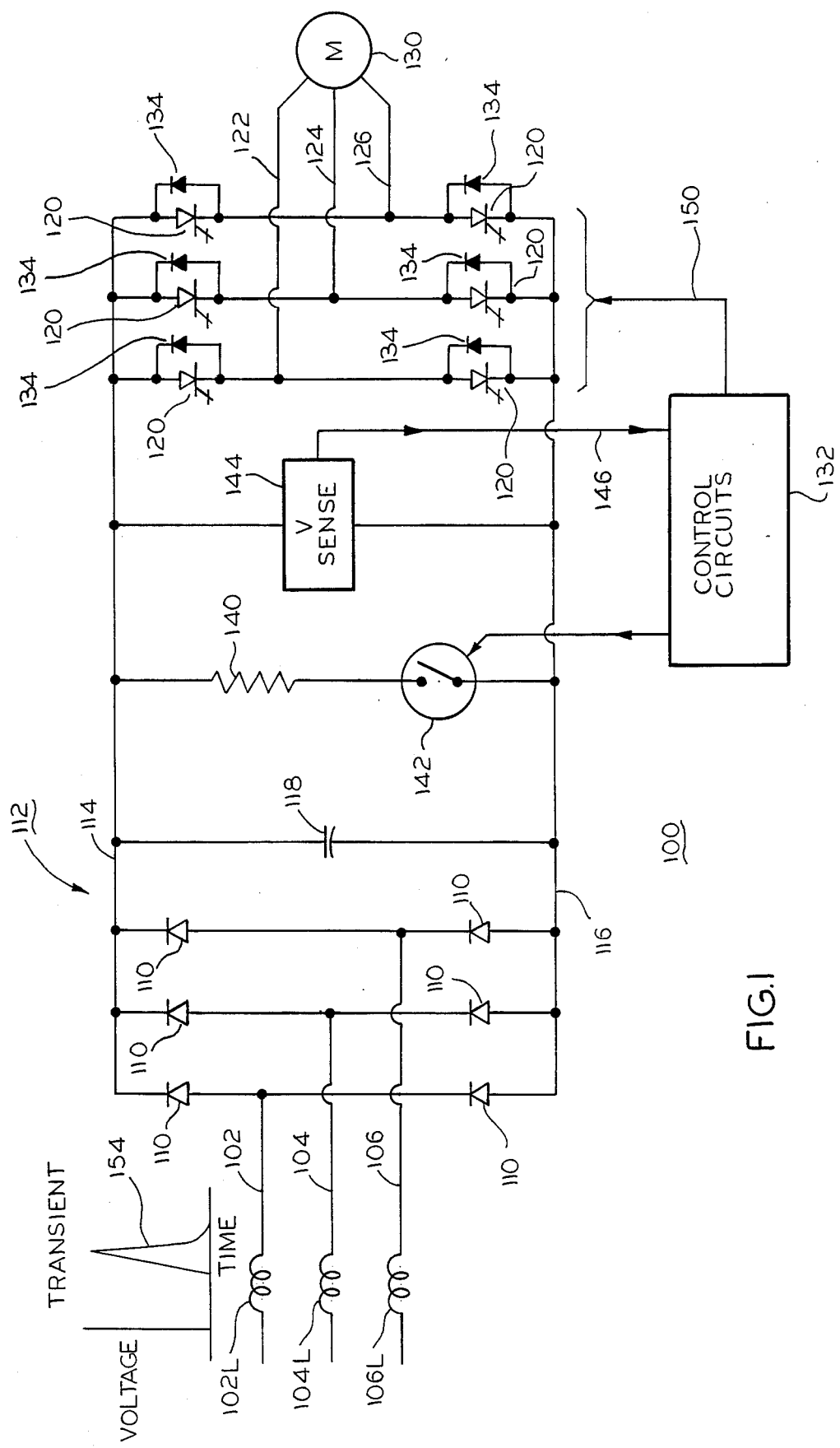
FIG. 1 is a schematic diagram of an AC inverter operated from a three phase AC supply line, having a DC bus, and supplying a three phase variable frequency alternating current to a motor.

FIG. 1 is a schematic drawing showing an inverter 100 drawing electrical energy from a three phase supply line having conductor 102 carrying phase one, conductor 104 carrying phase two, and conductor 106 carrying phase three. Diodes 110 provide a three phase rectifier for energizing the DC bus 112. DC bus 112 has positive conductor 114 and negative conductor 116. DC bus capacitor 118 is connected between the positive conductor 114 and the negative conductor 116 in order to provide smoothing of the rectified voltage across the DC bus.

Solid state switches 120 connect the positive conductor 114 and negative conductor 116 of the DC bus 112 alternately to conductors 122, 124, and 126 so as to produce a three phase alternating current flow into motor 130. The frequency of the alternating current supplied to motor 130 may be controlled by adjustment of the control circuit 132. Also, the fundamental RMS voltage supplied to motor 130 may be adjusted by use of the control circuits 132. Diodes 134 are connected across solid state switches 120, but in a reversed polarity, in order to provide a current path for currents produced in motor 130.

Resistor 140 may be connected between positive conductor 114 and negative conductor 116 of DC bus 112 by closure of switch 142. Switch 142 may conveniently be chosen to be any solid state switch which may be turned on and turned off electrically. Voltage sense circuit 144 measures the voltage between positive conductor 114 and negative conductor 116 of DC bus 112, and sends a signal indicative of the DC bus voltage on conductor 146 to control circuits 132.

Control circuits 132, in normal operation of the inverter, produce control signals on line 150, and these control signals operate the solid state switches 120. Control circuits 132 may also close switch 142, and may also open switch 142. Control circuits 132 may stop operation of the inverter by opening all of the solid state switches 120 by generating the proper control signals on line 150.

Resistor 140 may be switched into the circuit by closure of switch 142 in order to provide dynamic breaking of motor 130.

The invention protects against a voltage transient entering the apparatus on conductors 102, 104, and 106. A graph of a voltage transient is shown in FIG. 1 by graph 154. The graph 154 may indicate a phase to phase voltage excursion. For example a phase one to phase two voltage excursion would be measured between conductor 102 and conductor 104. Or alternatively, graph 154 may indicate a phase three to phase one transient and then it would indicate the voltage between conductor 102 and conductor 106. Transients may be produced on the AC line by a wide variety of processes. For example, a voltage transient may be introduced on a power line by the switching of power factor control capacitors by the electric power company. Such transients may be of sufficient magnitude and sufficient duration in time so as to drive the DC bus voltage to a value exceeding the voltage limitations of components of the inverter. For example, the solid state switches 120 may have their voltage limit exceeded by the transient on the DC bus, and thereby be destroyed by the transient.

Voltage sense circuit 144 measures the voltage between positive conductor 114 and negative conductor 116. Control circuits 132 sense the output of voltage sense circuit 144 as voltage sense signal 146. When the voltage sense signal 146 exceeds a predetermined value, the control circuits take remedial action. The remedial action taken by control circuits 132 includes closing of switch 142, and generating control signals on line 150 so as to put all of the solid state switches 120 into a nonconducting state. Resistor 140, when switch 142 is closed and the solid state switches 120 are in their nonconducting state, causes the discharge of buc capacitor 118. A typical power line transient may have a time duration of only a few milliseconds. When transients of such time duration occur, it is sufficient for the protection of the solid state switches 120 to keep switch 142 closed for only a short ime. The time necessary for switch 142 to be closed may be measured by the RC discharge time of capacitor 118 through resistor 140. It has been found satisfactory to close switch 142 for a time of approximately one-half the RC time constant. Capacitor 118 is charged by the transient to a voltage above the nominal voltage of the DC bus. Resistor 140 then discharges capacitor 118 toward the nominal DC bus voltage. Diodes 110 are reverse biased as long as the DC bus voltage exceeds the nominal bus voltage. After capacitor 118 discharges sufficiently so that the diodes 110 are once again forward biased, then current will again flow through the diodes and will tend to hold the DC bus voltage at the nominal value by supplying current to resistor 140.

It is important to turn off the solid state switches 120 supplying electric current to the motor for only the minimum time needed to reduce the DC bus voltage back to the DC bus nominal voltage because the motor will get out of synchronization if the solid sate switches 120 are turned off for too long. Two ways that the motor can get out of synchronization are that the motor can slow due to friction or loading so that it is not turning at synchronous speed with the fundamental frequency generated by the inverter, and secondly that voltage stabilization circuits may sense the drop in motor voltage and attempt to raise the motor voltage. It has been found that using an RC time constant for bus capacitor 118 and resistor 140 of between 10 milliseconds and 20 milliseconds, and turning the solid state switches off for only about one-half of the RC time constant, that the motor synchronization with the inverter is satisfactory when the solid state switches 120 are turned back on.

The impedance of the AC supply, represented by impedances 102L, 104L, and 106L, affect the peak value of the transient and the ringing characteristics of the transient. It may sometimes be convenient to connect the three phase power lines to the primary of a transformer 180 and to drive the inverter from the secondary of the transformer in order to favorably affect the waveform of the transient. Transformer 180 is shown in dashed lines in FIG. 2 as it is optical equipment and may not be needed.

After the period of time that switch 142 is held closed by control circuits 132, and after switch 142 is opened, then control circuits 132 begin generating control signals on line 150 in order to provide electric energy to motor 130.

It has been found satisfactory to use Gate Turn Off Thyristors (GTOs) for the solid state switches 120. The GTOs are protected from voltage transients by turning them off when a voltage transient occurs. Turning the GTOs off protects them during a transient because the offstate blocking voltage of the GTOs is typically several hundred volts greater than the allowable switching voltage. By turning off all GTOs during the initial rising phase of the transient this additional voltage margin may be used to protect the GTOs from the peak transient voltage. Solid state switches 120 may be controlled to produce a pulse width modulated three phase alternating current. Alternatively, solid state switches 120 may be programmed to produce any other simulated three phase alternating current such as 6 step or 12 step modulation.

FIG. 2 shows the apparatus in block diagram form. Three phase power conductors 102, 104, 106 supply energy to the three phase rectifier 160. Three phase rectifier 160 supplies energy to DC bus 112 having positive conductor 114 and negative conductor 116. Capacitor 118 provides smoothing on the DC bus.

Logic circuit 162 measures the voltage between positive conductor 114 and negative conductor 116. Logic circuit 162 closes switch 142 or opens switch 142 depending upon the logic value. Logic circuit 162 generates a control signal on line 164 which either inhibits or enables inverter control circuits 166. The inhibit signal may be used to lockout the inverter control circuits 166. Inverter control circuits 166 operate inverter 168. Lines 122, 124, and 126 provide three phase electrical energy which may be used to drive a motor.

If a voltage spike appears on supply lines 102, 104, 106, then the DC voltage between positive conductor 114 and negative conductor 116 rises. If this voltage rises higher than a predetermined voltage, then logic circuit 162 closes switch 142 and also generates an inhibit signal on line 164 thereby opening the solid state switches of inverter 168.

FIG. 3 shows a graph of DC bus voltage. A transient occurs at time point 170, causing a rapid rise in the DC bus voltage. FIG. 4 shows the closure of switch 142 at time point 170. The closure of switch 142 at time point 170 results in the discharge of capacitor 118 as shown in FIG. 3. FIG. 5 shows the lockout of inverter 168 beginning at time point 170, and continuing for a predetermined length of time. The amount of time necessary to keep switch 142 closed and inverter 168 locked out is determined by the magnitude of a transient on the AC supply lines, conductors 102, 104, 106. As noted above, it has been found satisfactory to keep the switch 142 closed and the inverter 168 inhibited for a time period of approximately one-half a discharge time constant of capacitor 118 through resistor 140.

An additional feature of the apparatus is to measure the time interval between transients of the DC bus voltage above a predetermined voltage. This time interval between transients of the DC bus voltage above the predetermined voltage is called the waiting time. If the waiting time is less than a minimum waiting time, then the apparatus turns off the solid state switches of the inverter until they are manually restarted. This feature of a minimum waiting time allows the apparatus to distinguish between a transient excursion of the DC bus voltage and a fault which must be cleared by manual intervention of an operator.

Figure 6:
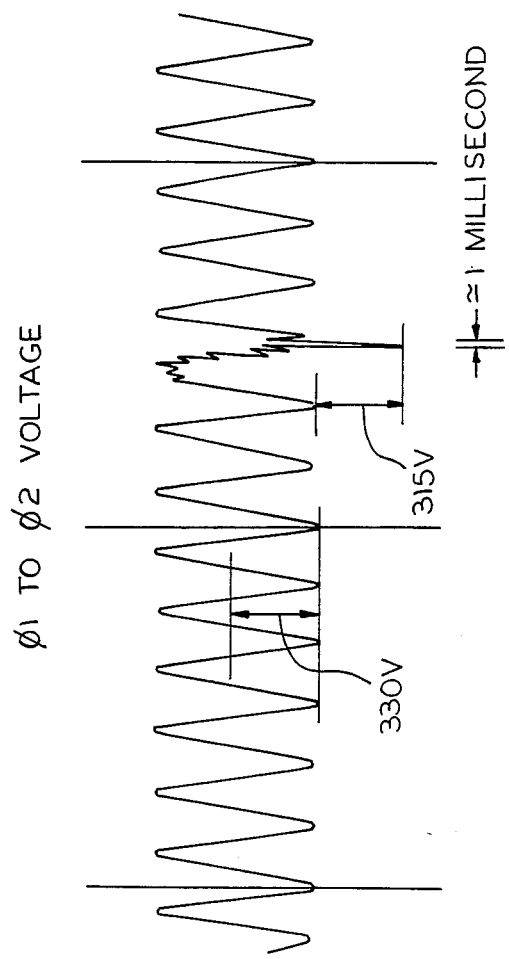
FIG. 6 is a graph showing a transient on AC supply lines and shows the phase one to phase two voltage.

A typical power line transient on supply conductors 102, 104, 106 are shown in FIG. 6. FIG. 6 shows a phase 1 to phase 2 voltage having a nominal value of approximately 330 volts, and a transient spike having a magnitude of approximately 315 volts for a time duration of approximately 1 millisecond. FIG. 6 is representative of measured power line spikes resulting from the electric power company switching power factor control capacitors.

Values found satisfactory in operation of the invention in which the inverter is sized to drive a 100 horsepower three phase electric motor include the following: DC bus capacitance value of 1,620 microfarads, a resistor of 9 ohms, leading to a RC time constant of 15 milliseconds. In this situation, it has been found sufficient to connect the resistance across the bus for approximately 7 milliseconds and also to inhibit operation of the inverter for approximately 7 milliseconds. The closure of switch 142 may be accomplished in approximately 10 microseconds, and also the control circuits 132 may inhibit inverter control signals 150 in approximately 10 microseconds, these two time intervals measured from the time that the DC bus voltage exceeds the predetermined value. The nominal three phase AC supply voltages is 480 volts RMS. With this supply voltage a nominal DC bus voltage of approximately 700 volts has been found to be satisfactory. Transients charging bus capacitor 118 to above 1,200 volts may be protected against when gate turn off thyristors (GTOs) are used for solid state switches 120. It has been found satisfactory to operate the DC bus voltage turn off predetermined value at approximately 900 volts. Typical operation permits both closure of switch 142 and inhibition of the inverter control signals in approximately 10 to 20 microseconds. The rise time of the transient is typically 500 to 800 microseconds, and therefore the solid state switches 120 can be turned off before the DC bus voltage increases above their voltage rating. A voltage of 900 volts has been found to be a satisfactory upper limit for the DC bus voltage in order to protect gate turn off thyristors used in the inverter as solid state switches 120. A value of 1.0 minute for the minimum waiting time between voltage transients of the DC bus voltage above the predetermined voltage has been found to be a satisfactory minimum waiting time. These values of the parameters have been found satisfactory for protection of a 100 horsepower inverter from typical power line transients generated by the electric power company switching power factor control capacitors.

Although the apparatus as shown and described herein is energized from a three phase alternating current supply and the inverter produces a three phase alternating current output, the utility of the invention is not limited to such an inverter. The invention may be used on any polyphase electric power line, and may be used for any polyphase power output application.

It is to be understood that the above described embodiments are simply illustrative of the principals of the invention. Various other modifications and changes may be made by those skilled in the art which will embody the principals of the invention and fall within the spirit and scope thereof.

What is claimed is:

1. A transient protection circuit for an inverter, comprising:
   a rectifier capable of supplying direct current (DC) from an alternating current (AC) power source;
   a DC bus fed by said rectifier;
   a bus capacitor connected across said DC bus;
   solid state switches for supplying alternating current to a load;
   means for sensing the voltage on said DC bus;
   a resistor;
   means responsive to said voltage on said DC bus for connecting said resistor in parallel with said bus capacitor if said DC bus voltage exceeds a predetermined voltage; and,
   means, responsive to said voltage on said DC bus, for turning off said solid state switches if said DC bus voltage exceeds said predetermined voltage, and for turning on said solid state switches and disconnecting said resistor from parallel connection with said bus capacitor if said DC bus voltage is somewhat below said predetermined voltage, whereby said solid state switches are protected from a DC bus overvoltage caused by a transient voltage rise in said AC power source.

2. The apparatus as in claim 1 further comprising:
   means for disconnecting said resistor from a parallel connection with said bus caapcitor and also for turning on said solid state switches on the elaspse of a predetermined idle time interval following an excursion of said DC bus voltage above said predetermined voltage.

3. The apparatus as in claim 2 wherein said idle time interval is approximately one half of an RC time constant value where R is the value of resistance of said resistor and C is the value of capacitance of said bus capacitor.

4. The apparatus as in claim 3 wherein said value of capacitance of said bus capacitor is approximately 1,620 microfarads, and the value of said resistor is approximately 9 ohms.

5. The apparatus as in claim 2 further comprising:
   means for turning off said solid state switches until they are manually reset when said means responsive to said voltage on said DC bus senses a second excursion of said DC bus voltage above said predetermined voltage within a predetermined waiting time interval.

6. The apparatus as in claim 5 wherein said waiting time interval is one minute.

7. The apparatus as in claim 1 wherein said means responsive to said voltage on said DC bus for connecting a resistor in parallel with said bus capacitor comprises a solid state switch.

8. The apparatus as in claim 1 wherein said means responsive to said voltage on said DC bus for turning off said solid state switches comprises a circuit for generating an inhibit signal to turn off a drive circuit for said solid state switches.

9. An apparatus as in claim 1 wherein said rectifier draws energy from a three phase alternating current circuit.

10. The apparatus as in claim 1 wherein said solid state switches comprise gate turn off thyristors.

11. The apparatus as in claim 1 wherein said solid state switches generate a pulse width modulated three phase alternating current for driving a motor.

12. The apparatus as in claim 1 further comprising an impedance between AC supply power lines and said inverter.

13. The apparatus as in claim 12 wherein said impedance is a transformer having a primary connected to said AC supply power lines and said inverter connected to a secondary of said transformer.

14. A transient protection circuit comprising:
   a fixed voltage rectifier capable of being driven by an alternating current source of electrical energy;
   a DC bus driven by said rectifier;
   a DC bus capacitor connected across said DC bus;
   an alternating current inverter comprising solid state switches driven by said DC bus for driving an alternating current load;
   a resistor connected so that one end of said resistor is connected to a first side of said DC bus, a second end of said resistor is connected to a first side of a control switch and a second side of said control switch is connected to a second side of said DC bus;
   a circuit for sensing the voltage on said DC bus;
   means responsive to said voltage on said DC bus for closing said control switch if said DC bus voltage exceeds a predetermined voltage,
   means responsive to said voltage on said DC bus for turning off said solid state switches if said DC bus voltage exceeds said predetermined value;
   means for disconnecting said resistor from across said DC bus and for restarting said solid state switches on the elapse of a predetermined idle time interval; and,
   means for turning off said solid state switches until a manual restart if said means responsive to said DC voltage on said DC bus senses a second excursion of said DC bus voltage above said predetermined voltage within a predetermined waiting time.

15. A method for protecting an inverter having a DC bus from transients on an AC line delivering energy to said inverter, said inverter having a DC bus capacitor and solid state switches for driving a load, comprising:
   detecting transients in the DC voltage on said DC bus;
   connecting a resistor across said DC bus in reponse to said voltage transients on said DC bus only for a predetermined idle time interval of about one half the time constant determined by the values of said resistor and said DC bus capacitor; and
   turning off solid state switches of said inverter in response to said voltage transietns on said DC bus only for said predetermined idle time interval, so as to protect said solid state switches from transients on said AC line.

16. An improved inverter for supplying alternating current (AC) to a load having,
   means for connection to an AC power source;
   a rectifier capable of drawing power from said AC power source for charging a DC bus;
   an inverter capable of drawing power from said DC bus and having solid state switches for generating alternating current of a predetermined frequency for driving said load;
   a bus capacitor connected across said DC bus for smoothing variations in voltage on said DC bus;
   wherein the improvement comprises:
   means for detecting a rise in the voltage across said DC bus, said rise in voltage being caused by a transient increase in voltage from said AC power source;
   means, responsive to said voltage on said DC bus exceeding a predetermined voltage, for disconnecting said inverter from said DC bus in order to protect said solid state switches from an overvoltage on said DC bus, for connecting a resistor in parallel with said bus capacitor to provide a discharge path for energy stored in said capacitor, and for reconnecting said inverter to said DC bus after said DC bus voltage falls below said predetermined voltage to reestablish the flow of power to said load,
   whereby said solid state switches are protected from said transient rise in voltage in said AC source and current flow to said load is interrupted for only a time sufficient for said capacitor to discharge sufficiently to bring said DC bus voltage below said predetermined voltage.

* * * * *